United States Patent
Norman et al.

(10) Patent No.: US 10,633,527 B2
(45) Date of Patent: *Apr. 28, 2020

(54) PROPYLENE-OLEFIN COPOLYMERS AND METHODS FOR MAKING THE SAME

(71) Applicant: ExxonMobil Chemical Patents Inc., Baytown, TX (US)

(72) Inventors: Alexander I. Norman, Houston, TX (US); Gregory K. Hall, Humble, TX (US); John R. Hagadorn, Houston, TX (US); Andy H. Tsou, Houston, TX (US); Peijun Jiang, League City, TX (US); Ying Ying Sun, Shanghai (CN); Sarah J. Mattler, League City, TX (US); Arturo Leyva, League City, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 175 days.

This patent is subject to a terminal disclaimer.

(21) Appl. No.: 15/651,323

(22) Filed: Jul. 17, 2017

(65) Prior Publication Data

US 2018/0044514 A1 Feb. 15, 2018

Related U.S. Application Data

(60) Provisional application No. 62/375,163, filed on Aug. 15, 2016.

(51) Int. Cl.
| | |
|---|---|
| *C08L 23/16* | (2006.01) |
| *C08F 210/16* | (2006.01) |
| *C08L 23/14* | (2006.01) |
| *C08F 210/06* | (2006.01) |

(52) U.S. Cl.
CPC ............ *C08L 23/16* (2013.01); *C08F 210/16* (2013.01); *C08L 23/14* (2013.01); *C08F 2500/01* (2013.01); *C08F 2500/02* (2013.01); *C08L 2205/025* (2013.01)

(58) Field of Classification Search
CPC .. C08L 23/16; C08L 2205/025; C08F 210/16; C08F 2500/01; C08F 2500/02
USPC ............................................................ 525/53
See application file for complete search history.

(56) References Cited

U.S. PATENT DOCUMENTS

| | | | |
|---|---|---|---|
| 6,525,157 B2 | 2/2003 | Cozewith et al. | |
| 7,026,405 B2 | 4/2006 | Cozewith et al. | |
| 7,803,876 B2 | 9/2010 | Yeh et al. | |
| 8,445,620 B2 * | 5/2013 | Tsou | C08L 23/10 526/126 |
| 9,522,984 B2 * | 12/2016 | Kaneno | C08J 9/0061 |
| 2005/0159553 A1 | 7/2005 | Cozewith et al. | |
| 2009/0105404 A1 * | 4/2009 | van Riel | C08F 290/046 524/528 |
| 2009/0111945 A1 * | 4/2009 | Datta | C08L 23/10 525/232 |
| 2009/0270545 A1 | 10/2009 | Sahnoune et al. | |
| 2010/0152360 A1 * | 6/2010 | Jiang | C08L 23/12 524/515 |
| 2011/0184127 A1 | 7/2011 | Williams | |
| 2014/0221587 A1 | 8/2014 | Hagadorn et al. | |

FOREIGN PATENT DOCUMENTS

| | | |
|---|---|---|
| WO | 2015/130340 | 9/2015 |
| WO | WO 2016/053467 | * 4/2016 |
| WO | 2016/114914 | 7/2016 |

* cited by examiner

*Primary Examiner* — Michael Bernshteyn

(57) ABSTRACT

Provided is a composition having 70 wt % to 90 wt % of a first propylene-olefin copolymer component having an ethylene content of 15 to 21 wt %; and 10 wt % to 30 wt % of a second propylene-olefin copolymer component having an ethylene content of 6 to 10 wt %; wherein the weight average molecular weight of the first component is 250,000 to 1,780,000 g/mol higher than the weight average molecular weight of the second component; wherein the reactivity ratio product of the first component is less than 0.75; wherein the reactivity ratio product of the second component is greater than or equal to 0.75.

4 Claims, 1 Drawing Sheet

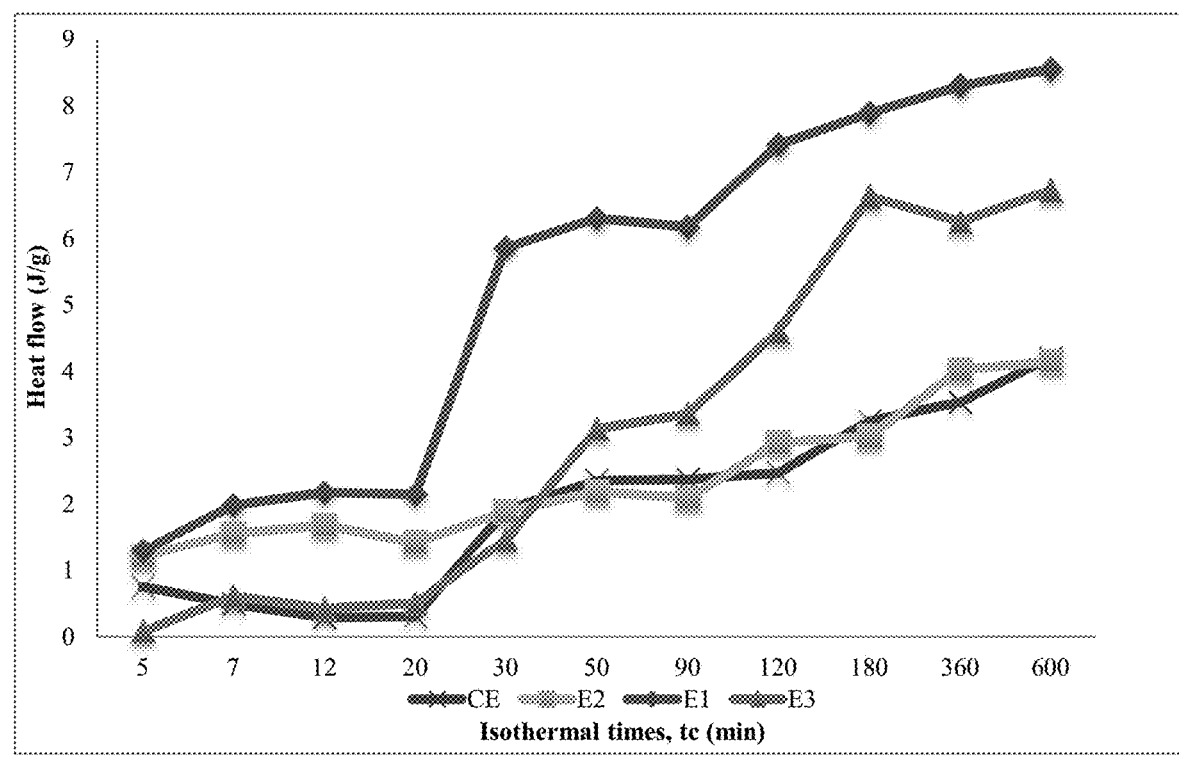

PROPYLENE-OLEFIN COPOLYMERS AND METHODS FOR MAKING THE SAME

PRIORITY CLAIM

This application claims priority to and benefit of U.S. Ser. No. 62/375,163, filed Aug. 15, 2016 and is incorporated herein by reference in its entirety.

FIELD

This invention is related to propylene olefin copolymers that are a blend of high and low molecular weight propylene olefin copolymers to produce a blend useful for soft, elastic applications.

BACKGROUND

Polyolefin polymers and polymer blends are known for their utility in a wide variety of applications. In particular, many polyolefin polymers, including copolymers of propylene with other olefins such as ethylene, are well suited for use in applications requiring good stretchability, elasticity, and strength. Such polymers often comprise a blend of two or more propylene copolymers, and may be manufactured by physically blending two or more copolymers, or by reactor blending of the copolymers.

Many polyolefin blends known in the prior art are formed into pellets for intermediate storage purposes before being shaped into articles such as fibers, films, nonwovens, extruded coatings, and molded articles. Some of these compositions, however, are known to exhibit poor pellet stability over extended periods of time, leading to agglomeration of pellets and resulting in pellet batches that a do not flow/pour well, particularly after storage and shipping under hot climate conditions. Further, the typically low melting points of such known polymer blends often lead to flattening or other deformation of polymer pellets during long-term storage, which also negatively affects the ability of the polymer pellets to be free-flowing. While blending such polyolefin copolymers with higher-crystallinity components has been shown to improve stability properties of the polymer pellets, such pellets lose some of their elasticity and still have a tendency to agglomerate during shipping and long-term storage, thus presenting processing issues where free-flowing pellets are required.

As a result, many known polyolefin blend pellets are blended with approximately 10 wt % of a crystalline random propylene-ethylene copolymer, as disclosed in U.S. Pat. Nos. 7,026,405 and 7,803,876. While the resultant polyolefin are pellet stable, they are generally less elastic with a higher tension set, top load, and hysteresis as compared to the original polyolefin blend pellets without the random copolymer. Accordingly, such products have limited utility in applications where enhanced elasticity is required.

The inventors have discovered that incorporating a high molecular weight pyridyl diamido-based catalyzed copolymer with a low molecular weight metallocene catalyzed copolymer can produce a balance of a pellet stable bimodal propylene olefin copolymer having suitable elastic recovery properties. In contrast to products prepared with a random propylene-ethylene copolymer, the olefin copolymers of the invention have a broad split in molecular of each component but a narrow split in olefin content of each component.

SUMMARY

In one aspect, provided herein is a composition comprising from about 70 wt % to about 90 wt % of a first propylene alpha-olefin copolymer component having an ethylene content of about 15 to about 21 wt %; and from about 10 wt % to about 30 wt % of a second propylene alpha-olefin copolymer component having an ethylene content of about 6 to about 10 wt %; wherein the weight average molecular weight of the first component is about 250,000 to about 1,780,000 g/mol higher than the weight average molecular weight of the second component wherein the reactivity ratio product of the first component is less than 0.75; wherein the reactivity ratio product of the second component is greater than or equal to 0.75; and wherein the composition has at least one of the following properties: (i) a tension set of less than about 15%; (ii) a top load of less than about 8 N; (iii) a retractive force of greater than about 3.5 N; or (iv) a hysteresis of less than about 35%.

BRIEF DESCRIPTION OF THE DRAWINGS

The FIGURE shows the crystallization kinetics of a comparative propylene-based elastomer and three inventive propylene olefin copolymers.

DETAILED DESCRIPTION

Various specific embodiments and versions of the present invention will now be described, including preferred embodiments and definitions that are adopted herein. While the following detailed description gives specific preferred embodiments, those skilled in the art will appreciate that these embodiments are exemplary only, and that the present invention can be practiced in other ways. Any reference to the "invention" may refer to one or more, but not necessarily all, of the embodiments defined by the claims. The use of headings is for purposes of convenience only and does not limit the scope of the present invention.

All numerical values within the detailed description and the claims herein are modified by "about" or "approximately" the indicated value, and take into account experimental error and variations that would be expected by a person having ordinary skill in the art.

As used herein, the term "copolymer" is meant to include polymers having two or more monomers, optionally, with other monomers, and may refer to interpolymers, terpolymers, etc. The term "polymer" as used herein includes, but is not limited to, homopolymers, copolymers, terpolymers, etc., and alloys and blends thereof. The term "polymer" as used herein also includes impact, block, graft, random, and alternating copolymers. The term "polymer" shall further include all possible geometrical configurations unless otherwise specifically stated. Such configurations may include isotactic, syndiotactic and atactic symmetries. The term "blend" as used herein refers to a mixture of two or more polymers. The term "elastomer" shall mean any polymer exhibiting some degree of elasticity, where elasticity is the ability of a material that has been deformed by a force (such as by stretching) to return at least partially to its original dimensions once the force has been removed.

The term "alpha-olefin" includes ethylene.

The term "monomer" or "comonomer," as used herein, can refer to the monomer used to form the polymer, i.e., the unreacted chemical compound in the form prior to polymerization, and can also refer to the monomer after it has been incorporated into the polymer, also referred to herein as a "[monomer]-derived unit". Different monomers are discussed herein, including propylene monomers, ethylene monomers, and diene monomers.

"Reactor grade," as used herein, means a polymer that has not been chemically or mechanically treated or blended after polymerization in an effort to alter the polymer's molecular structure such as average molecular weight, molecular weight distribution, or viscosity. Particularly excluded from those polymers described as reactor grade are those that have been visbroken or otherwise treated or coated with peroxide or other prodegradants. For the purposes of this disclosure, however, reactor grade polymers include those polymers that are reactor blends.

"Reactor blend," as used herein, means a blend of two or more polymers produced in situ as the result of sequential or parallel polymerization of one or more monomers with the formation of one polymer in the presence of another, or by solution blending polymers made separately in parallel reactors. Reactor blends may be produced in a single reactor, a series of reactors, or parallel reactors and are reactor grade blends. Reactor blends may be produced by any polymerization method, including batch, semi-continuous, or continuous systems. Particularly excluded from "reactor blend" polymers are blends of two or more polymers in which the polymers are blended ex situ, such as by physically or mechanically blending in a mixer, extruder, or other similar device.

Propylene Olefin Copolymers

The propylene olefin copolymer of the invention comprises a blend of a first propylene olefin component and a second propylene olefin component. The first component is present in the amount of about 70 wt % to about 90 wt % of the copolymer and the second component is present in the amount of about 10 wt % to about 30 wt % of the copolymer. The olefin comonomer units for each component may be derived from ethylene, butene, pentene, hexene, 4-methyl-1-pentene, octene, or decene. In preferred embodiments the comonomer is ethylene. In some embodiments, each of the components consists essentially of propylene and ethylene derived units, or consists only of propylene and ethylene derived units. Some of the embodiments described below are discussed with reference to ethylene as the comonomer, but the embodiments are equally applicable to other copolymers with other higher α-olefin comonomers.

The copolymer may include at least about 5 wt %, at least about 7 wt %, at least about 9 wt %, at least about 10 wt %, at least about 12 wt %, at least about 13 wt %, at least about 14 wt %, at least about 15 wt %, or at least about 16 wt %, α-olefin-derived units, based upon the total weight of the copolymer. The copolymer may include up to about 30 wt %, up to about 25 wt %, up to about 22 wt %, up to about 20 wt %, up to about 19 wt %, up to about 18 wt %, or up to about 17 wt %, α-olefin-derived units, based upon the total weight of the copolymer. In some embodiments, the copolymer may comprise from about 5 to about 30 wt %, from about 6 to about 25 wt %, from about 7 wt % to about 20 wt %, from about 10 to about 19 wt %, from about 12 wt % to about 19 wt %, or from about 15 wt % to about 18 wt %, or form about 16 wt % to about 18 wt %, α-olefin-derived units, based upon the total weight of the copolymer.

The copolymer may include at least about 70 wt %, at least about 75 wt %, at least about 78 wt %, at least about 80 wt %, at least about 81 wt %, at least about 82 wt %, or at least about 83 wt %, propylene-derived units, based upon the total weight of the copolymer. The copolymer may include up to about 95 wt %, up to about 93 wt %, up to about 91 wt %, up to about 90 wt %, up to about 88 wt %, or up to about 87 wt %, up to about 86 wt %, or up to about 85 wt %, or up to about 84 wt %, propylene-derived units, based upon the total weight of the copolymer.

The copolymers can be characterized by a melting point (Tm), which can be determined by differential scanning calorimetry (DSC). Using the DSC test method described herein, the melting point is the temperature recorded corresponding to the greatest heat absorption within the range of melting temperature of the sample, when the sample is continuously heated at a programmed rate. When a single melting peak is observed, that peak is deemed to be the "melting point." When multiple peaks are observed (e.g., principle and secondary peaks), then the melting point is deemed to be the highest of those peaks. It is noted that due to the low-crystallinity of many copolymers, the melting point peak may be at a low temperature and be relatively flat, making it difficult to determine the precise peak location. A "peak" in this context is defined as a change in the general slope of the DSC curve (heat flow versus temperature) from positive to negative, forming a maximum without a shift in the baseline where the DSC curve is plotted so that an endothermic reaction would be shown with a positive peak.

As used herein, the "glass transition temperature" (Tg) is measured using dynamic mechanical analysis. This test provides information about the small-strain mechanical response of a sample as a function of temperature over a temperature range that includes the glass transition region and the visco-elastic region prior to melting. Specimens are tested using a commercially available DMA instrument (e.g., TA Instruments DMA 2980 or Rheometrics RSA) equipped with a dual cantilever test fixture. The specimen is cooled to −130° C. then heated to 60° C. at a heating rate of 2° C./min while subjecting to an oscillatory deformation at 0.1% strain and a frequency of 6.3 rad/sec.

The copolymer can have a triad tacticity (mm tacticity), as measured by 13C NMR, of 75% or greater, 80% or greater, 85% or greater, 90% or greater, 92% or greater, 95% or greater, or 97% or greater. In one or more embodiments, the triad tacticity may range from about 75% to about 99%, from about 80% to about 99%, from about 85% to about 99%, from about 90% to about 99%, from about 90% to about 97%, or from about 80% to about 97%. Triad tacticity is determined by the methods described in U.S. Pat. No. 7,232,871.

Propylene crystallinity is probed using X-ray scattering methods. Since polypropylene is a semi-crystalline polymer, the crystal structure can be resolved using X-ray diffraction (XRD) or Wide-Angle X-ray Scattering (WAXS). The unit cells of the crystalline polymer are the building blocks of the crystalline lamellae: planar sheets of crystalline material. Since not all polymer chains can crystallize, amorphous chains also exist and these typically are found in between stacks of crystalline lamellae. WAXS can probe the extent to which these polymer chains crystallize since the data will contain information regarding crystalline and amorphous morphology. WAXS also can determine crystalline orientation and crystallite size. All wide-angle X-ray scattering (WAXS) were performed using an in-house SAXSLAB Ganesha 300XL+. Polymer pellet samples were melt pressed into discs approximately 0.5 mm thick from a melt of 190° C. Samples were cooled in air over 7 days and then placed directly in the path of the incident X-ray beam. The incident wavelength was 0.154 nm from a CuKc microfocus sealed tube source (Xenocs). All samples were collected at sample-to-detector positions of 91 mm and were held in a vacuum to minimize air scatter. The SAXS and WAXS were recorded using a Dectris Pilatus. Sample to detector distance was calibrated using a Silver Behenate standard. A 0-360 integration was performed on the 2D scattering patterns. The Intensities were recorded as a function of scattering vector, q, where $q=4\pi \sin \theta/\lambda$ ($\theta$ is the scattering angle and $\lambda$ is the incident wavelength) and the scattering vector q is also defined as $q=2\pi/d$ where d is a distance in real space: unit cell dimension from WAXS, and inter-lamellae spacing from SAXS.

All data were corrected for transmission, background scattering and detector non-linearity.

The crystallinity of the film samples is obtained from WAXS: unit cell type and overall extent of crystallinity. WAXS and SAXS patterns were collapsed to an I(q) vs q plot. The overall degree of crystallinity of the film samples was determined by taking the ratio of the peak areas of the (110), (040), (130), (111) and (131) (which were fit to a Gaussian function) to the total area underneath the 1D WAXS profile[1]. The amorphous region was also fit to a Gaussian curve. See Ryan, A. J., et al., A synchrotron X-ray study of melting and recrystallization in isotactic polypropylene. Polymer, 1997, 38(4): p. 759-768.

The comonomer content and sequence distribution of the polymers can be measured using $^{13}C$ nuclear magnetic resonance (NMR) by methods well known to those skilled in the art. Comonomer content of discrete molecular weight ranges can be measured using methods well known to those skilled in the art, including Fourier Transform Infrared Spectroscopy (FTIR) in conjunction with samples by GPC, as described in Wheeler and Willis, Applied Spectroscopy, 1993, Vol. 47, pp. 1128-1130. For a propylene ethylene copolymer containing greater than 75 wt % propylene, the comonomer content (ethylene content) of such a polymer can be measured as follows: A thin homogeneous film is pressed at a temperature of about 150° C. or greater, and mounted on a Perkin Elmer PE 1760 infrared spectrophotometer. A full spectrum of the sample from 600 cm-1 to 4000 cm-1 is recorded and the monomer weight percent of ethylene can be calculated according to the following equation: Ethylene wt %=82.585−111.987X+30.045X2, where X is the ratio of the peak height at 1155 cm-1 and peak height at either 722 cm-1 or 732 cm-1, whichever is higher. For propylene ethylene copolymers having 75 wt % or less propylene content, the comonomer (ethylene) content can be measured using the procedure described in Wheeler and Willis. Reference is made to U.S. Pat. No. 6,525,157 which contains more details on GPC measurements, the determination of ethylene content by NMR and the DSC measurements.

Mw, Mn and Mw/Mn are determined by using a High Temperature Gel Permeation Chromatography (Agilent PL-220), equipped with three in-line detectors, a differential refractive index detector (DRI), a light scattering (LS) detector, and a viscometer. Experimental details, including detector calibration, are described in: T. Sun, P. Brant, R. R. Chance, and W. W. Graessley, Macromolecules, Volume 34, Number 19, pp. 6812-6820, (2001) and references therein. Three Agilent PLgel 10 μm Mixed-B LS columns are used. The nominal flow rate is 0.5 mL/min, and the nominal injection volume is 300 μL. The various transfer lines, columns, viscometer and differential refractometer (the DRI detector) are contained in an oven maintained at 145° C. Solvent for the experiment is prepared by dissolving 6 grams of butylated hydroxytoluene as an antioxidant in 4 liters of Aldrich reagent grade 1,2,4-trichlorobenzene (TCB). The TCB mixture is then filtered through a 0.1 μm Teflon filter. The TCB is then degassed with an online degasser before entering the GPC-3D. Polymer solutions are prepared by placing dry polymer in a glass container, adding the desired amount of TCB, then heating the mixture at 160° C. with continuous shaking for about 2 hours. All quantities are measured gravimetrically. The TCB densities used to express the polymer concentration in mass/volume units are 1.463 g/ml at room temperature and 1.284 g/ml at 145° C. The injection concentration is from 0.5 to 2.0 mg/ml, with lower concentrations being used for higher molecular weight samples. Prior to running each sample the DRI detector and the viscometer are purged. Flow rate in the apparatus is then increased to 0.5 ml/minute, and the DRI is allowed to stabilize for 8 hours before injecting the first sample. The LS laser is turned on at least 1 to 1.5 hours before running the samples. The concentration, c, at each point in the chromatogram is calculated from the baseline-subtracted DRI signal, $I_{DRI}$, using the following equation:

$$c = K_{DRI} I_{DRI}/(dn/dc)$$

where $K_{DRI}$ is a constant determined by calibrating the DRI, and (dn/dc) is the refractive index increment for the system. The refractive index, n=1.500 for TCB at 145° C. and $\lambda$=690 nm. Units on parameters throughout this description of the GPC-3D method are such that concentration is expressed in $g/cm^3$, molecular weight is expressed in g/mole, and intrinsic viscosity is expressed in dL/g.

The LS detector is a Wyatt Technology High Temperature DAWN HELEOS. The molecular weight, M, at each point in the chromatogram is determined by analyzing the LS output using the Zimm model for static light scattering (M. B. Huglin, LIGHT SCATTERING FROM POLYMER SOLUTIONS, Academic Press, 1971):

$$\frac{K_o c}{\Delta R(\theta)} = \frac{1}{MP(\theta)} + 2A_2 c.$$

Here, $\Delta R(\theta)$ is the measured excess Rayleigh scattering intensity at scattering angle $\theta$, c is the polymer concentration determined from the DRI analysis, $A_2$ is the second virial coefficient. $P(\theta)$ is the form factor for a monodisperse random coil, and $K_o$ is the optical constant for the system:

$$K_o = \frac{4\pi^2 n^2 (dn/dc)^2}{\lambda^4 N_A}$$

where $N_A$ is Avogadro's number, and (dn/dc) is the refractive index increment for the system, which take the same value as the one obtained from DRI method. The refractive index, n=1.500 for TCB at 145° C. and $\lambda$=657 nm.

A high temperature Viscotek Corporation viscometer, which has four capillaries arranged in a Wheatstone bridge configuration with two pressure transducers, is used to determine specific viscosity. One transducer measures the total pressure drop across the detector, and the other, positioned between the two sides of the bridge, measures a differential pressure. The specific viscosity, $\eta_S$, for the solution flowing through the viscometer is calculated from their outputs. The intrinsic viscosity, $[\eta]$, at each point in the chromatogram is calculated from the following equation:

$$\eta_S = c[\eta] + 0.3(c[\eta])^2$$

where c is concentration and was determined from the DRI output.

The branching index ($g'_{vis}$) is calculated using the output of the GPC-DRI-LS-VIS method as follows. The average intrinsic viscosity, $[\eta]_{avg}$, of the sample is calculated by:

$$[\eta]_{avg} = \frac{\sum c_i [\eta]_i}{\sum c_i}$$

where the summations are over the chromatographic slices, i, between the integration limits.

The branching index $g'_{vis}$ is defined as:

$$g'vis = \frac{[\eta]_{avg}}{kM_v^\alpha}.$$

$M_V$ is the viscosity-average molecular weight based on molecular weights determined by LS analysis. Z average branching index ($g'z_{ave}$) is calculated using Ci=polymer concentration in the slice i in the polymer peak times the mass of the slice squared, $Mi^2$.

All molecular weights are weight average unless otherwise noted. All molecular weights are reported in g/mol unless otherwise noted. Branching Index. The ethylene elastomers described herein preferably having a branching index of greater than about 0.5. The relative degree of branching in the propylene-olefin is determined using a branching index factor (BI). Calculating this factor requires a series of three laboratory measurements of polymer properties in solutions as disclosed in VerStrate, Gary, "Ethylene-Propylene Elastomers", Encyclopedia of Polymer Science and Engineering, 6, 2nd edition (1986). These are: (i) Mw, GPC LALLS, weight average molecular weight measured using a low angle laser light scattering (LALLS) technique in combination with Gel Permeation Chromatography (GPC) (ii) weight average molecular weight (MwDRI) and viscosity average molecular weight (MvDRI) using a differential refractive index (DRI) detector in combination with GPC and (iii) intrinsic viscosity (IV) measured in decalin at 135° C. The first two measurements (i and ii) are obtained in a GPC using a filtered dilute solution of the polymer in trichlorobenzene.

In embodiments, the weight average molecular weight of the first polymer component is greater than that of the second polymer component. In embodiments, the weight average molecular weight of the first polymer component is greater than about 250,000 g/mol, or about 500,000 g/mol, or about 750,000 g/mol, or about 1,000,000 g/mol, or about 1,500,000 g/mol, or about 1,780,000 g/mol higher than that of the second polymer component. Preferably, the weight average molecular weight of the first polymer component is greater than about 400,000 g/mol, or about 450,000 g/mol, or about 500,000 g/mol to less than about 1,800,000 g/mol, or about 1,750,000 g/mol, or about 1,500,000 g/mol. Preferably, the weight average molecular weight of the second polymer component is greater than about 20,000 g/mol, or about 30,000 g/mol, or about 50,000 g/mol to less than about 150,000 g/mol, or about 125,000 g/mol, or about 100,000 g/mol.

The first component of the copolymer may have a melt flow rate (MFR), as measured according to ASTM D-1238 (2.16 kg weight @ 230° C.) of from less than 0.1 g/10 min to 0.3 g/10 min and the second component of the copolymer may have a MFR of from 20 g/10 min to 15,000 g/10 min.

In preferred embodiments, the copolymer is a reactor grade or reactor blended polymer, as defined above. That is, in preferred embodiments, the copolymer is a reactor blend of a first polymer component and a second polymer component. Thus, the comonomer content of the copolymer can be adjusted by adjusting the comonomer content of the first polymer component, adjusting the comonomer content of second polymer component, and/or adjusting the ratio of the first polymer component to the second polymer component present in the copolymer.

In embodiments where the copolymer is a reactor blended polymer, the α-olefin content of the first polymer component ("$R_1$") may be greater than 5 wt %, greater than 7 wt %, greater than 10 wt %, greater than 12 wt %, greater than 15 wt %, or greater than 17 wt %, based upon the total weight of the first polymer component. The α-olefin content of the first polymer component may be less than 30 wt %, less than 27 wt %, less than 25 wt %, less than 22 wt %, less than 20 wt %, or less than 19 wt %, based upon the total weight of the first polymer component. In some embodiments, the α-olefin content of the first polymer component may range from 5 wt % to 30 wt %, from 7 wt % to 27 wt %, from 10 wt % to 25 wt %, from 12 wt % to 22 wt %, from 15 wt % to 20 wt %, or from 17 wt % to 19 wt %. Preferably, the first polymer component comprises propylene and ethylene derived units, or consists essentially of propylene and ethylene derived units.

In embodiments where the copolymer is a reactor blended polymer, the α-olefin content of the second polymer component ("$R_2$") may be greater than 1.0 wt %, greater than 1.5 wt %, greater than 2.0 wt %, greater than 2.5 wt %, greater than 2.75 wt %, or greater than 3.0 wt %, or greater than 5.0 wt %, or greater than 6.0 wt % α-olefin, based upon the total weight of the second polymer component. The α-olefin content of the second polymer component may be less than 10 wt %, less than 9 wt %, less than 8 wt %, less than 7 wt %, less than 6 wt %, or less than 5 wt %, based upon the total weight of the second polymer component. In some embodiments, the α-olefin content of the second polymer component may range from 1.0 wt % to 10 wt %, or from 1.5 wt % to 9 wt %, or from 2.0 wt % to 8 wt %, or from 2.5 wt % to 7 wt %, or from 2.75 wt % to 6 wt %, or from 3 wt % to 5 wt %. Preferably, the second polymer component comprises propylene and ethylene derived units, or consists essentially of propylene and ethylene derived units.

In embodiments where the copolymer is a reactor blended polymer, the copolymer may comprise from 1 to 25 wt % of the second polymer component, from 3 to 20 wt % of the second polymer component, from 5 to 20 wt % of the second polymer component, from 7 to 15 wt % of the second polymer component, from 8 to 12 wt % of the second polymer component, or from 15 to 20 wt % of the second polymer component, based on the weight of the copolymer, where desirable ranges may include ranges from any lower limit to any upper limit. The copolymer may comprise from 70 to 99 wt % of the first polymer component, from 70 to 90 wt % of the first polymer component, from 80 to 97 wt % of the first polymer component, from 85 to 93 wt % of the first polymer component, or from 82 to 92 wt % of the first polymer component, based on the weight of the copolymer, where desirable ranges may include ranges from any lower limit to any upper limit.

Copolymerization of monomer M1 and monomer M2 leads to two types of polymer chains—one with monomer M1 at the propagating chain end (M1*) and other with monomer M2 (M2*). Four propagation reactions are then possible. Monomer M1 and monomer M2 can each add either to a propagating chain ending in monomer M1 or to one ending in monomer M2, i.e.,

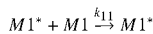
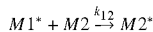
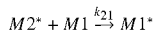
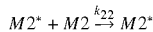

where $k_{11}$ is the rate constant for inserting M1 to a propagating chain ending in M1 (i.e. M1*), $k_{12}$ is the rate constant for inserting M2 to a propagating chain ending in M1 (i.e., M1*), and so on. The monomer reactivity ratio $r_1$ and $r_2$ are defined as $$r_1 = \frac{k_{11}}{k_{12}}; r_2 = \frac{k_{22}}{k_{21}}$$

$r_1$ and $r_2$ as defined above is the ratio of the rate constant for a reactive propagating species adding its own type of monomer to the rate constant for its addition of the other monomer. The tendency of two monomers to copolymerize is noted by values of $r_1$ and $r_2$. An $r_1$ value greater than unity means that M1* preferentially inserts M1 instead of M2, while an $r_1$ value less than unity means that M1* preferentially inserts M2. An $r_1$ value of zero would mean that M1 is incapable of undergoing homopolymerization.

The preferential insertions of two monomers in the copolymerization lead to three distinguish polymer chain structures. When the two monomers are arranged in an alternating fashion, the polymer is called an alternating copolymer:

-M1-M2-M1-M2-M1-M2-M1-M2-M1-M2-M1-M2-M1-M2-.

In a random copolymer, the two monomers are inserted in a random order:

-M1-M1-M2-M1-M2-M2-M1-M2-M1-M1-M2-M2-M2-M1-.

In a block copolymer, one type of monomer is grouped together in a chain segment, and another one is grouped together in another chain segments. A block copolymer can be thought of as a polymers with multiple chain segments with each segment consisting of the same type of monomer:

-M2-M2-M2-M2-M1-M1-M1-M2-M2-M2-M1-M1-M1-M1-.

The classification of the three types of copolymers can be also reflected in the reactivity ratio product, $r_1r_2$. As is known to those skilled in the art, when $r_1r_2=1$, the polymerization is called ideal copolymerization. Ideal copolymerization occurs when the two types of propagating chains M1* and M2* show the same preference for inserting M1 or M2 monomer. The copolymer is "statistically random." For the case, where the two monomer reactivity ratios are different, for example, $r_1>1$ and $r_2<1$ or $r_1<1$ and $r_2>1$, one of the monomers is more reactive than the other toward both propagating chains. The copolymer will contain a larger proportion of the more reactive monomer in random placement.

When both $r_1$ and $r_2$ are greater than unity (and therefore, also $r_1r_2>1$), there is a tendency to form a block copolymer in which there are blocks of both monomers in the chain. For the special case of $r_1>>r_2$ (i.e. $r_1>>1$ and $r_2<<1$), both types of propagating chains preferentially add to monomer M1. There is a tendency toward "consecutive homopolymerization" of the two monomers to form block copolymer. A copolymer having reactivity product, $r_1r_2$, greater than 1.5 contains relatively long homopolymer sequences and is said to be "blocky."

The two monomers enter into the copolymer in equimolar amounts in a nonrandom, alternating arrangement along the copolymer chain when $r_1r_2=0$. This type of copolymerization is referred to as alternating copolymerization. Each of the two types of propagating chains preferentially adds to the other monomer, that is, M1 adds only to M2* and M2 adds only to M1*. The copolymer has the alternating structure irrespective of the co-monomer feed composition.

The behavior of most copolymer systems lies between the two extremes of ideal and alternating copolymerization. As the $r_1r_2$ product decreases from unity toward zero, there is an increasing tendency toward alternation. Perfect alternation will occur when r1 and r2 become progressively less than unity. In other words, a copolymer having a reactivity ratio product $r_1r_2$ of between 0.75 and 1.5 is generally said to be random. When $r_1r_2>1.5$ the copolymer is said to be "blocky." The first component of the invention has a reactivity ratio of less than 0.75 and is therefore considered "alternating". The second component of the invention has a reactivity ratio of greater than or equal to 0.75 and is therefore considered "random".

The reactivity ratio product is described more fully in Textbook of Polymer Chemistry, F. W. Billmeyer, Jr., Interscience Publishers, New York, p. 221 et seq. (1957). For a copolymer of ethylene and propylene, the reactivity ratio product $r_1r_2$, where $r_1$ is the reactivity ratio of ethylene and $r_2$ is the reactivity ratio of propylene, can be calculated from the measured diad distribution (PP, EE, EP and PE in this nomenclature) by the application of the following formulae: $r_1r_2=4$ (EE)(PP)/(EP)$^2$.

The copolymers are preferably prepared using homogeneous conditions, such as a continuous solution polymerization process. In some embodiments, the copolymer are prepared in parallel solution polymerization reactors, such that the first reactor component is prepared in a first reactor and the second reactor component is prepared in a second reactor, and the reactor effluent from the first and second reactors are combined and blended to form a single reactor effluent from which the final copolymer is separated. Exemplary methods for the preparation of copolymers may be found in U.S. Pat. Nos. 6,881,800; 7,803,876; 8,013,069; and 8,026,323 and PCT Publications WO 2011/087729; WO 2011/087730; and WO 2011/087731, incorporated herein by reference.

Preferably, the first reactor component of the copolymer is polymerized using a non-metallocene catalyst and the second reactor component of the copolymer is polymerized using a metallocene catalyst. The term "non-metallocene catalyst", also known as "post-metallocene catalyst" describe transition metal complexes that do not feature any pi-coordinated cyclopentadienyl anion donors (or the like) and are useful the polymerization of olefins when combined with common activators. See Baier, M. C.; Zuideveld, M. A.; Mecking, S. Angew. Chem. Int. Ed. 2014, 53, 2-25; Gibson, V. C., Spitzmesser, S. K. Chem. Rev. 2003, 103, 283-315; Britovsek, G. J. P., Gibson, V. C., Wass, D. F. Angew. Chem. Int. Ed. 1999, 38, 428-447; Diamond, G. M. et al. ACS Catal. 2011, 1, 887-900; Sakuma, A., Weiser, M. S., Fujita, T. Polymer J. 2007, 39:3, 193-207. See also U.S. Pat. Nos. 6,841,502, 7,256,296, 7,018,949, 7,964,681.

Preferably, the first reactor component of the copolymer is a pyridyl diamide catalyzed and the second reactor component of the copolymer is metallocene catalyzed. The pyridyl diamide catalyst has the following structural formula:

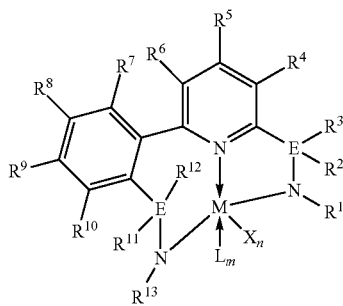

wherein M is a Group 3-12 metal; E is selected from carbon, silicon, or germanium; X is an anionic leaving group, such as, but not limited to alkyl, aryl, hydride, alkylsilane, fluoride, chloride, bromide, iodide, triflate, carboxylate, alkylsulfonate, amide, alkoxide, and hydroxide; L is a neutral Lewis base, such as, but not limited to ether, amine, thioether; and $R^{13}$ are independently selected from the group consisting of hydrocarbyls, substituted hydrocarbyls, and silyl groups; $R^2$ through $R^{12}$ are independently selected from the group consisting of hydrogen, hydrocarbyls, alkoxy, silyl, amino, aryloxy, substituted hydrocarbyls, halogen, and phosphino; n is 1 or 2 or 3; m is 0, 1, or 2; and two X groups may be joined together to form a dianionic group; two L groups may be joined together to form a bidentate Lewis base; an X group may be joined to an L group to form a monoanionic bidentate group; any two adjacent R groups (e.g. $R^7$ & $R^8$, $R^{10}$ & $R^{11}$, etc.) may be joined to form a substituted or unsubstituted hydrocarbyl or heterocyclic ring, where the ring has 5, 6, 7, or 8 ring atoms and where substitutions on the ring can join to form additional rings; (preferably an aromatic ring, a six membered aromatic ring with the joined $R^7R^8$ group being —CH=CHCH=CH—); and $R^{11}$ may be joined to form a ring (preferably a five membered ring with the joined $R^{10}R^{11}$ group being —CH$_2$CH$_2$—, a six membered ring with the joined $R^{10}R^{11}$ group being —CH$_2$CH$_2$CH$_2$—).

Preferably, M is a Group 4 metal, such as zirconium or hafnium. Preferably, n is 2 and m is 0; Preferably, E is carbon. Preferred X groups include chloride, fluoride, methyl, ethyl, propyl, butyl, isobutyl, benzyl, hydrido, dialkylamido, dimethylamido, diethylamido, trimethylsilylmethyl, and neopentyl. Preferred $R^1$ groups include aryls, substituted aryls, 2,6-disubstituted aryls, 2,4,6-trisubtituted aryls, 2,6-diisopropylphenyl, 2,4,6-triisopropylphenyl, 2,6-diisopropyl-4-methyl-phenyl, xylyl, mesityl, and 2-ethyl-6-isopropylphenyl. Preferred $R^{13}$ groups include aryls, substituted aryls, 2-substituted aryls, cycloalkyl, cyclohexyl, cyclopentyl, 2,5-disubstituted aryl, 2-methylphenyl, 2-ethylphenyl, 2-isopropylphenyl, phenyl, and 4-methylphenyl. Preferred $R^2/R^3$ pairs include H/H, H/aryl, H/2-substituted aryl, H/alkyl, H/phenyl, H/2-methylphenyl, and H/2-isopropylphenyl.

In a preferred embodiment, both $R^7$ and $R^8$ are hydrogen.

In a preferred embodiment, $R^7$ and $R^8$ are joined together to form a six-membered aromatic ring.

In a preferred embodiment, $R^{10}$ and $R^{11}$ are joined together to form a five or six-membered ring.

In a preferred embodiment, $R^{11}$ and $R^{12}$ are both hydrogen.

In a preferred embodiment, $R^1$ and $R^{13}$ may be independently selected from phenyl groups that are variously substituted with between zero to five substituents that include F, Cl, Br, I, $CF_3$, $NO_2$, alkoxy, dialkylamino, aryl, and alkyl groups having 1 to 10 carbons, such as methyl, ethyl, propyl, butyl, pentyl, hexyl, heptyl, octyl, nonyl, decyl, and isomers thereof.

Preferred $R^3$-E-$R^2$ groups and preferred $R^{12}$-E-$R^{11}$ groups include $CH_2$, $CMe_2$, $SiMe_2$, $SiEt_2$, $SiPr_2$, $SiBu_2$, $SiPh_2$, Si(aryl)$_2$, Si(alkyl)$_2$, CH(aryl), CH(Ph), CH(alkyl), and CH(2-isopropylphenyl), where alkyl is a $C_1$ to $C_{40}$ alkyl group (preferably $C_1$ to $C_{20}$ alkyl, preferably one or more of methyl, ethyl, propyl, butyl, pentyl, hexyl, heptyl, octyl, nonyl, decyl, undecyl, dodecyl, and isomers thereof), aryl is a $C_5$ to $C_{40}$ aryl group (preferably a $C_6$ to $C_{20}$ aryl group, preferably phenyl or substituted phenyl, preferably phenyl, 2-isopropylphenyl, or 2-tertbutylphenyl).

Examples of suitable metallocene catalysts for polymerizing the second component include those of capable of producing crystalline poly-alpha-olefins, such as crystalline propylene homopolymers and semi-crystalline propylene copolymers, include those obeying the following general formula (1):

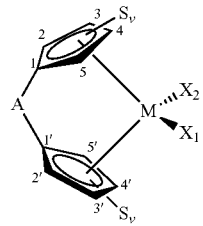

Formula (1)

wherein M is a Group 3, 4, 5 or 6 transition metal atom, or a lanthanide metal atom, or actinide metal atom, preferably a Group 4 transition metal atom selected from titanium, zirconium or hafnium; each cyclopentadienyl (Cp) ring is substituted with from zero to four substituent groups $S_v$, each substituent group $S_v$ being, independently, a hydrocarbyl, substituted-hydrocarbyl, halocarbyl, substituted-halocarbyl, hydrocarbyl-substituted organometalloid, halocarbyl-substituted organometalloid, disubstituted boron, disubstituted pnictogen, substituted chalcogen or halogen radical, provided that two adjacent $S_v$ groups may be joined to form a $C_4$ to $C_{20}$ ring to give a saturated or unsaturated polycyclic ligand, wherein the subscript "v" denotes the carbon atom on the Cp-ring to which the substituent is bonded; A is a bridging group; and $X_1$ and $X_2$ are, independently, hydride radicals, hydrocarbyl radicals, substituted hydrocarbyl radicals, halocarbyl radicals, substituted halocarbyl radicals, and hydrocarbyl- and halocarbyl-substituted organometalloid radicals, substituted pnictogen radicals, or substituted chalcogen radicals; or $X_1$ and $X_2$ are joined and bound to the metal atom to form a metallacycle ring containing from about 3 to about 20 carbon atoms; or $X_1$ and $X_2$ together can be an olefin, diolefin or aryne ligand; or when Lewis-acid activators, such as methylalumoxane, which are capable of donating an $X_1$ ligand as described above to the transition metal component are used, $X_1$ and $X_2$ may independently be a halogen, alkoxide, aryloxide, amide, phosphide or other univalent anionic ligand or both $X_1$ and $X_2$ can also be joined to form a anionic chelating ligand and with the proviso that $X_1$ and $X_2$ are not a substituted or unsubstituted cyclopentadienyl ring.

Conveniently, A is a bridging group containing boron or a Group 14, 15 or 16 element. Examples of suitable bridging groups include R'$_2$C, R'$_2$Si, R'$_2$CCR'$_2$, R'$_2$CCR'$_2$CR'$_2$, R'$_2$CCR'$_2$CR'$_2$CR'$_2$, R'C=CR', R'C=CR'CR'$_2$, R'$_2$CCR'=CR'CR'$_2$, R'C=CR'CR'=CR', R'C=CR'CR'$_2$CR'$_2$, R'$_2$CSiR'$_2$, R'$_2$SiSiR'$_2$, R'$_2$CSiR'$_2$CR'$_2$, R'$_2$SiCR'$_2$SiR'$_2$, R'C=CR'SiR'$_2$, R'$_2$CGeR'$_2$, R'$_2$GeGeR'$_2$, R'$_2$CGeR'$_2$CR'$_2$, R'$_2$GeCR'$_2$GeR'$_2$, R'$_2$SiGeR'$_2$, R'C=CR'GeR'$_2$, RB, R'$_2$C—BR', R'$_2$C—BR—CR'$_2$, RN, R'P, O, S, Se, R'$_2$C—O—CR'$_2$, R'$_2$CR'$_2$C—O—CR$_2$CR$_2$, R'$_2$C—O—CR'$_2$CR'$_2$, R'$_2$C—O—CR'=CR', R'$_2$C—S—CR'$_2$, R'$_2$CR'$_2$C—S—CR'$_2$CR'$_2$, R'$_2$C—S—CR'$_2$CR'$_2$, R'$_2$C—S—CR'=CR', R'$_2$C—Se—CR'$_2$, R'$_2$CR'$_2$C—Se—CR'$_2$CR'$_2$, R'$_2$C—Se—CR'$_2$CR'$_2$, R'$_2$C—Se—CR'=CR', R'$_2$C—N=CR', R'$_2$C—NR—CR'$_2$, R'$_2$C—NR'—CR'$_2$CR'$_2$, R'—NR'—CR'=CR', R'—NR'—CR'$_2$CR'$_2$, R'$_2$C—P=CR', and R'$_2$C—PR'—CR' where R is hydrogen or a C$_1$-C$_{20}$ containing hydrocarbyl, substituted hydrocarbyl, halocarbyl, substituted halocarbyl, silylcarbyl or germylcarbyl substituent and optionally two or more adjacent R may join to form a substituted or unsubstituted, saturated, partially unsaturated or aromatic, cyclic or polycyclic substituent. Preferred examples for the bridging group A include CH$_2$, CH$_2$CH$_2$, CH(CH$_3$)$_2$, O, S, SiMe$_2$, SiPh$_2$, SiMePh, Si(CH$_2$)$_3$ and Si(CH$_2$)$_4$.

Preferred transition metal compounds for producing poly-alpha-olefins having enhanced isotactic character are those of formula 1 where the S$_v$ groups are independently chosen such that the metallocene framework 1) has no plane of symmetry containing the metal center, and 2) has a C$_2$-axis of symmetry through the metal center. These complexes, such as rac-Me$_2$Si(indenyl)$_2$ZrMe$_2$ and rac-Me$_2$Si(indenyl)$_2$HfMe$_2$, are well known in the art and generally produce isotactic polymers with high degrees of stereoregularity.

Preferred metallocene catalysts useful for producing the second polymer in the process of the invention are not narrowly defined but generally it is found that the most suitable are those in the generic class of bridged, substituted bis(cyclopentadienyl) metallocenes, specifically bridged bis (indenyl) metallocenes. Preferably, useful metallocene compounds having two cyclopentadienyl rings are represented by the formula:

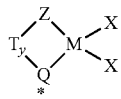

wherein: M is the same as M described above, preferably M is titanium, zirconium or hafnium, Zr or Hf; Z and Q* are, independently, a substituted or unsubstituted Cp group (useful Z and Q* groups are represented by the formula: (C$_5$H$_{4-d}$S*$_d$), where d is 1, 2, 3, or 4, S* is hydrocarbyl groups, heteroatoms, or heteroatom-containing groups, such as methyl, ethyl, propyl, butyl, pentyl, hexyl, heptyl, octyl, nonyl, decyl, undecyl, dodecyl, or an isomer thereof, N, O, S, P, or a C$_1$ to C$_{20}$ hydrocarbyl substituted with an N, O, S and or P heteroatom or heteroatom-containing group (typically having up to 12 atoms, including the N, O, S, and P heteroatoms) and two S* may form a cyclic or multicyclic group; T is a bridging group as described above that is bonded to Z and Q*, y is zero or one; and each X is, independently, a univalent anionic ligand, or two X are joined and bound to the metal atom to form a metallocycle ring, or two X are joined to form a chelating ligand, a diene ligand, or an alkylidene ligand provided that when y is one then at least one of Z and Q* is preferably not an indene group, alternately, both of Z and Q* are not indene. In an alternate embodiment, when y is one, Z and Q* are not 2,4 substituted indene, preferably are not 2-methyl, 4-phenyl indene. Example of bis(indenyl) metallocenes compound includes μ-(CH3)2 Si(indenyl)2 Hf(Cl)2 and μ-(CH3)2 Si(indenyl)2 Hf(CH3)2.

The activators for these metallocene catalysts can methylaluminoxane (MAO), or a non-coordinating anion activator selected from the group consisting of dimethylanilinium- or trityl-fluoroarylborates, wherein the fluoroaryl group is pentafluorophenyl, perfluoronaphthyl, or quadrafluoro-trihydronaphthyl.

As used in this document, the term "room temperature" is used to refer to the temperature range of about 20° C. to about 23.5° C.

The propylene-olefin copolymer can be made using general polymerization techniques known in the art. Any solution, suspension, slurry and bulk and gas phase polymerization process known in the art can be used. Such processes can be run in batch, semi-batch or continuous mode. Homogeneous solution processes are preferred.

In a typical solution process, catalyst components, solvent, monomers and hydrogen (when used) are fed under pressure to one or more reactors. The temperature of the reactor is controlled by the rate of catalyst addition (rate of polymerization), the temperature of the solvent/monomer feed stream and/or the use of heat transfer systems. For olefin polymerization, reactor temperatures can range from about 60° C. to about 250° C., while pressures are generally higher than 300 psig. In one embodiment, the polymerization temperature is preferably at least 50, or 60, or 70° C., or within a range from 50, or 60, or 70, or 80, or 90, or 100, or 120 to 130, or 140, or 150, or 160, or 170° C.

The monomers are dissolved/dispersed in the solvent either prior to being fed to the first reactor (or for gaseous monomers the monomer may be fed to the reactor so that it will dissolve in the reaction mixture). Prior to mixing, the solvent and monomers are generally purified to remove potential catalyst poisons. The feedstock may be heated or cooled prior to feeding to the first reactor. Additional monomers and solvent may be added to the second reactor, and it may be heated or cooled. The catalysts/activators can be fed in the first reactor or split between two reactors. In solution polymerization, polymer produced is molten and remains dissolved in the solvent under reactor conditions, forming a polymer solution (also referred as to effluent).

The solution polymerization process of this invention uses stirred reactor system comprising one or more stirred polymerization reactors. Generally the reactors should be operated under conditions to achieve a thorough mixing of the reactants. In a dual reactor system, the first polymerization reactor preferably operates at lower temperature. The residence time in each reactor will depend on the design and the capacity of the reactor. The catalysts/activators can be fed into the first reactor only or split between two reactors. Alternatively, a loop reactor is preferred.

The polymer solution is then discharged from the reactor as an effluent stream and the polymerization reaction is quenched, typically with coordinating polar compounds, to prevent further polymerization. On leaving the reactor system the polymer solution is passed through a heat exchanger system on route to a devolatilization system and polymer finishing process. Under certain conditions of temperature and pressure, the polymer solution can phase separate into a polymer lean phase and a polymer rich phase. Phase separation occurs at the lower critical solution temperature (LCST). Increasing the temperature or decreasing the pressure at the LCST point leads to further phase separation.

A polymer can be recovered from the effluent of either reactor or the combined effluent, by separating the polymer from other constituents of the effluent. Conventional separation means may be employed. For example, polymer can be recovered from effluent by coagulation with a non-solvent such as isopropyl alcohol, acetone, or n-butyl alcohol, or the polymer can be recovered by stripping the solvent or other media with heat or steam. One or more conventional additives such as antioxidants can be incorporated in the polymer during the recovery procedure. Possible antioxidants include phenyl-beta-naphthylamine; di-tert-butylhydroquinone, triphenyl phosphate, heptylated diphenylamine, 2,2'-methylene-bis(4-methyl-6-tert-butyl)phenol, and 2,2,4-trimethyl-6-phenyl-1,2-dihydroquinoline. Other methods of recovery such as by the use of lower critical solution temperature (LCST) followed by devolatilization are also envisioned.

Preferably, the propylene-olefin copolymer described herein is produced in either batch or continuous multistage polymerization processes. Each polymerization stage is defined as a single polymerization reactor or a polymerization zone within a single reactor. More specifically, a multistage polymerization may involve either two or more sequential polymerizations (also referred to as a series process) or two or more parallel polymerizations (also referred to herein as a "parallel process"). Preferably, the polymerization is conducted in a parallel process.

Each component of the propylene-olefin copolymer made in the respective reactors of the continuous, multiple reactor solution process are blended in solution without prior isolation from the solvent. The blends may be a result of series reactor operation, where at least part of the effluent of a first reactor enters a second reactor and where the effluent of the second reactor can be submitted to finishing steps involving devolatilization. The blend may also be the result of parallel reactor operation where the effluents of both reactors are combined and submitted to finishing steps. Either option provides an intimate admixture of the polymers in the devolatilized copolymers. Either case permits a wide variety of polysplits to be prepared whereby the proportion of the amounts of each component produced in the respective reactors can be varied widely.

Preferably, the propylene-olefin copolymer is a reactor blend. The method discussed herein has the advantage of eliminating the need for a melt blending operation and enables intimate blends of the copolymers to be made in the original reaction medium. Such materials have unique properties because they are not subjected to shear degradation in melt processing equipment. The degree of mixing of each component of the blend is more intimate.

Disclosed herein are continuous processes for making the propylene-olefin copolymer. The process comprises contacting monomers including ethylene and propylene with a catalyst system in a first polymerization zone, thereby forming a mixture that includes the propylene copolymers, said first propylene copolymer having an ethylene content of about 15 to about 20 wt %; polymerizing in a second polymerization zone by contacting a second monomer system and a second catalyst system capable of providing propylene copolymer, said second propylene copolymer having an ethylene content of about 6 to about 10 wt %. Preferably the said second catalyst is different from the first catalyst system.

In one example of a parallel process, two reactors are configured such that monomers, catalyst(s) and solvent are fed independently to each reactor. The first and second polymerizations are preferably taking place simultaneously in a parallel process.

The molecular weight characteristics (e.g., Mw, Mn, etc.) of the propylene-olefin copolymer and also of the individual-propylene copolymer components can in certain circumstances be adjusted depending upon the desired properties of the propylene-olefin copolymer. Those molecular weight characteristics are described elsewhere herein. For example, the molecular weight characteristics of each polymer can be set by choosing the reactor temperature, monomer concentration, and by optionally adding chain transfer agents such as hydrogen. Also, molecular weight can generally be lowered by increasing reaction temperatures, and raised by increasing monomer concentrations.

The propylene olefin copolymer may be used to prepare nonwoven elastic articles. The nonwoven products described above may be used in articles such as hygiene products, including, but not limited to, diapers, feminine care products, and adult incontinent products. The nonwoven products may also be used in medical products such as a sterile wrap, isolation gowns, operating room gowns, surgical gowns, surgical drapes, first aid dressings, and other disposable items. In particular, the nonwoven products may be useful as facing layers for medical gowns, and allow for extensibility in the elbow area of the gown. The nonwoven products may also be useful in disposable protective clothing, and may add toughness to elbow and knee regions of such clothing. The nonwoven products may also be useful as protective wrapping, packaging, or wound care. The nonwoven products may also be useful in geotextile applications, as the fabric may have improved puncture resistance in that the fabric will deform instead of puncture. See U.S. Patent Publication No. 2011/81529 and U.S. Pat. No. 7,319,077. The propylene olefin copolymer may also be suitable for use in an elastic films, as described in U.S. Pat. No. 6,500,563; blow films, as described in U.S. Patent Publication No. 2009/94027; and cast-films, as described in U.S. Pat. No. 7,655,317. In an embodiment of the invention, the nonwoven elastic article has a basis weight in the range of about 5 to about 100 gsm, preferably 15 to 75 gsm, preferably 20 to 50 gsm. In an embodiment of the invention, the nonwoven elastic article is a film having a gauge in the range of about 5 to about 100 μm, preferably 15 to 75 μm, preferably 20 to 50 μm.

The propylene olefin copolymer has suitable elastic properties for use in nonwoven articles, including low tension set, top load, and hysteresis, and high retractive force. The method of measurement for evaluating these elastic properties is described in the Examples section below. In an embodiment, the tension set of the copolymer is less than about 25%, preferably less than about 20%, most preferably less than about 15%. In an embodiment, the top load of the copolymer is less than about 15 N, preferably less than about 10 N, most preferably less than about 8 N. In an embodiment, the retractive force is greater than about 1 N, preferably greater than about 2 N, and most preferably greater than about 3.5 N. In an embodiment, the hysteresis of the copolymer is less than about 45%, preferably less than about 40%, most preferably less than about 35%. In an embodiment, the copolymer of the invention has at least one of the above-mentioned properties. In an embodiment, the copolymer of the invention has one or more of the above-mentioned properties, in any combination thereof.

The disclosure will now be more particularly described with reference to the following Examples.

EXAMPLES

Comparative Example 1 (CE1)

CE1 is a reactor blended propylene-based elastomer where the major component has 16 wt % ethylene content and 3 MFR (Mw of 240,000 g/mol) and the minor component has 4 wt % ethylene and 8 MFR (Mw of 195,000 g/mol). Both the first and second components of CE1 have an r1r2 of about 0.8 to about 0.9. CE1 is made in a reactor using C2-symmetric metallocene catalyst of dimethylsilyl bis(indenyl) hafnium dimethyl precursor activated by dimethylanilinium tetrakis(heptafluoronaphthyl) borate. CE1 was selected as the comparable example for its good elasticity.

Example 1 (E1)

E1 is a solution blend of 80 wt % component (i) (propylene-ethylene copolymer having 15.7 wt % ethylene content and a weight average molecular weight of 531,000 g/mol) and 20 wt % component (ii) (propylene-ethylene copolymer having 9.8 wt % ethylene content and a weight average molecular weight of 22,000 g/mol). 8 grams of component (i) and 2 grams of component (ii) were placed in a 500 mL round bottom flask. 400 mL of xylene and a magnetic stirrer was added to the flask. The flask was placed on an IKA hot plate with a stirrer, set at a stir rate of 250 rpm. The solution was stirred for 14-16 hours after which the temperature was raised to 130° C. and the solution was stirred at this temperature for an additional 6 hours. The stir rate was raised to 800 rpm for the final 5 minutes. The hot solution was then poured into a large glass evaporation dish. The flask was washed with 30-40 mL of hot xylene three times and the wash was added to the evaporating dish. The solution was cooled for an hour at room temperature in a general purpose hood. The dish was then placed in a vacuum oven with nitrogen purge and a solvent trap. The oven was set at 50° C. and the solution was dried under vacuum for 48 hours.

E1 component (i) was polymerized using a C1 symmetric 2,6-diisopropyl-N-((6-(2-((o-tolylamido)methyl)naphthalen-1-yl)pyridin-2-yl)methyl)anilidohafnium dimethyl precursor activated by dimethylanilinium tetrakis(pentafluorophenyl) borate. Polymerizations were carried out in a continuous stirred tank reactor system. A 1-liter Autoclave reactor was equipped with a stirrer, a pressure controller, and a water cooling/steam heating element with a temperature controller. The reactor was operated in liquid fill condition at a reactor pressure in excess of the bubbling point pressure of the reactant mixture, keeping the reactants in liquid phase. All feeds (solvent and monomers) were pumped into the reactors by Pulsa feed pumps and the flow rates were controlled using Coriolis mass flow controller (Quantim series from Brooks) except for the ethylene, which flowed as a gas under its own pressure through a Brooks flow controller. Similarly, H2 feed was controlled using a Brooks flow controller. Ethylene, H2 and propylene feeds were combined into one stream and then mixed with a pre-chilled isohexane stream that had been cooled to at least 0° C. The mixture was then fed to the reactor through a single line. Scavenger solution was added to the combined solvent and monomer stream just before it entered the reactor to further reduce any catalyst poisons. Similarly, catalyst solution was fed to the reactor using an ISCO syringe pump through a separated line.

Isohexane (used as solvent), and monomers (e.g., ethylene and propylene) were purified over beds of alumina and molecular sieves. Toluene for preparing catalyst solutions was purified by the same technique.

An isohexane solution of tri-n-octyl aluminum (TNOA) (25 wt % in hexane, Sigma Aldrich) was used as scavenger solution. 2,6-diisopropyl-N-((6-(2-((o-tolylamido)methyl)naphthalen-1-yl)pyridin-2-yl)methyl)anilidohafnium dimethyl was activated with N,N-dimethyl anilinium tetrakis (pentafluorophenyl) borate at a molar ratio of about 1:1 in 900 ml of toluene.

The polymer produced in the reactor exited through a back pressure control valve that reduced the pressure to atmospheric. This caused the unconverted monomers in the solution to flash into a vapor phase which was vented from the top of a vapor liquid separator. The liquid phase, comprising mainly polymer and solvent, was collected for polymer recovery. The collected samples were first air-dried in a hood to evaporate most of the solvent, and then dried in a vacuum oven at a temperature of about 90° C. for about 12 hours. The vacuum oven dried samples were weighed to obtain yields.

The scavenger feed rate was adjusted to optimize the catalyst efficiency and the feed rate varied from 0 (no scavenger) to 15 μmol/min. The catalyst feed rates may also be adjusted according to the level of impurities in the system to reach the targeted conversions listed. All the reactions were carried out at a pressure of about 2.4 MPa/g unless otherwise mentioned. The reaction temperature was 70° C. with feed rates of 14 g/min for propylene, 0.9 g/min for ethylene, 2.41 ml/min for H2, and 56.7 g/min for isohexane. The overall conversion was 32.9 wt %.

E1 component (ii) was polymerized using a C2-symmetric metallocene catalyst of dimethylsilyl bis(indenyl) hafnium dimethyl precursor activated by dimethylanilinium tetrakis(heptafluorophenyl) borate. This material was also made in a continuous stirred tank reactor by following the same procedure as used for E1 component (i), except that a 1-liter Autoclave reactor was used. The catalyst was pre-activated with the activator at a molar ratio of about 1:1 in 900 mL of toluene. All catalyst solutions were kept in an inert atmosphere and fed into reactors using an ISCO syringe pump. TNOAL solution was further diluted in isohexane and used as a scavenger. Scavenger feed rate was adjusted to maximize the catalyst efficiency. The reaction was carried out at a temperature of 115° C., propylene feed rate of 14.58 g/min, an ethylene feed rate of 1 g/min, and isohexane feed rate of 59.4 g/min. The overall conversion was 55.5 wt %.

Example 2 (E2)

E2 is a blend of 80 wt % of component (i) (propylene-ethylene copolymer having 20.2 wt % ethylene and a weight average molecular weight of 717,000 g/mol) and 20 wt % of component (ii) (propylene-ethylene copolymer having 9.8 wt % ethylene and a weight average molecular weight of 22,000 g/mol). 8 grams of component (i) and 2 grams of component (ii) were placed in a 500 mL round bottom flask. 400 mL of xylene was added to the flask, with a magnetic stirrer. The flask was placed on an IKA hot plate and the stirrer was set at a 250 rpm stir rate. The solution was stirred for 14-16 hours after which the temperature was raised to 130° C. and the solution was stirred at this temperature for 6 additional hours. The stir rate was raised to 800 rpm for the final 5 minutes. The hot solution was then poured into a large glass evaporation dish. The flask was washed with about 30-40 mL of hot xylene three times and the wash added to the evaporating dish. The solution was cooled for an hour at room temperature in a general purpose hood. The dish was then placed in a vacuum oven with nitrogen purge and a solvent trap. The oven was set at 50° C. and the solution was dried under vacuum for 48 hours.

E2 component (i) was polymerized by following the same procedure as used for E1 component (i), described above. The polymerization reaction was carried out at a temperature of 70° C., a propylene feed rate of 14 g/min, ethylene feed rate of 0.9 g/min, H2 feed rate of 2.41 scc/min (H2 was diluted with $N_2$) and isohexane feed rate of 56.7 g/min. The overall conversion was 27.5 wt %. E2 component (ii) is the same as E1 component (ii).

Example 3 (E3)

E3 is a blend of 80 wt % of component (i) (propylene-ethylene copolymer with 16.0 wt % ethylene and a weight average molecular weight of 686,000 g/mol) and 20 wt % of component (ii) (propylene-ethylene copolymer with 9.8 wt % ethylene and a weight average molecular weight of 22,000 g/mol). 8 grams of component (i) and 2 grams of component (ii) were placed in a 500 mL round bottom flask. 400 mL of xylene was added to the flask with a magnetic stirrer. The flask was placed on an IKA hot plate and stirrer, set at a 250 rpm stir rate. The solution was allowed to stir for 14-16 hours after which the temperature was raised to 130° C. and the solution was stirred at this temperature for 6 additional hours. The stir rate was raised to 800 rpm for the final 5 minutes. The hot solution was then poured into a large glass evaporation dish. The flask was washed with about 30-40 mL of hot xylene three times and the wash added to the evaporating dish. The solution was cooled for an hour at room temperature in a general purpose hood. The dish was then placed in a vacuum oven with nitrogen purge and a solvent trap. The oven was set at 50° C. and the solution was dried under vacuum for 48 hours.

E3 component (i) was polymerized by following the same procedure as used for E1 component (i). The reaction was carried out at a temperature of 85° C., propylene feed rate of 14 g/min, ethylene feed rate of 0.9 g/min and isohexane feed rate of 56.7 g/min. The overall conversion was 31.8 wt %.

E3 component (ii) is identical to E1 component (ii).
Characterization of CE1, E1, E2, and E3 Components

TABLE 1

COMPOSITION CHARACTERIZATION RESULTS

| Sample | $C_2$ wt % | MFR g/10 min | Mw kg/mol | PDI | r1r2 | % mm | x-ray crystal[2] |
|---|---|---|---|---|---|---|---|
| CE1 | 14.7 | 3 | 248 | 1.7 | 0.85 | 88.5 | 10% |
| E1(i) | 15.7 | <1 | 531 | 2.0 | 0.59 | 94.7 | 3% |
| E2(i) | 20.2 | <1 | 717 | 2.0 | 0.54 | 99.9 | <0.5% |
| E3(i) | 16.0 | <1 | 686 | 1.7 | 0.59 | 95.6 | 1% |
| E1/2/3(ii) | 9.7 | N/A | 22 | 2 2 | 0.87 | 82.2 | 22% |

[1]Crystallizable sequence
[2]Crystallinity determined by x-ray after aging for a minimum of 7 days Solution Blending 80 wt % E1(i) and 20 wt % E1(ii); 80 wt % E2(i) and 20 wt % E2(ii); and 80 wt % E3(i) and 20 wt % E3(ii) were solution blended in xylene at 130° C. by the process described above. The resulting blend was compression molded using a Fontijne melt vacuum press and aged for a minimum of 7 days after molding before the mechanical testing, described below, was conducted.

Elastic Properties of CE1, E1, E2, and E3 Blends

A Fontijne melt vacuum press was used to mold a 2 mm thick plaque of each sample. The temperature was ramped up to 190° C. and held for 5 minutes followed by 5 minutes under compression before cooling to room temperature. ASTM type 3 dog bones were punched simultaneously using a gang die and clicker press. The sample was aged for a minimum of 7 days after molding before tests were performed, to ensure that the samples which slowly crystallize arrive at their final crystallinity. An Instron tensile tester was used for the mechanical tests. The sample was placed in the grips with a 35 mm grip separation. Slack was manually removed so that the reading on the instrument registered a positive tensile force before starting the test. The sample was stretched to a 100% extension at 100 mm/min. The crosshead returned to 0% extension. The cycle was repeated. The elasticity, top load, permanent set, hysteresis, averaged over measurements are reported in Table 2 during the first and second cycles of loading.

All three bimodal blends (E1, E2 and E3) have favorably lower set, top load, and hysteresis as compared to CE1.

TABLE 2

ELASTIC PROPERTIES

| Sample | 1st set (%) | Top load (N) | Retractive Force (N) | Hysteresis (%) | 2nd set (%) | 2nd Top load (N) | 2nd Retractive (N) | 2nd Hysteresis (%) |
|---|---|---|---|---|---|---|---|---|
| CE1 | 13.0 | 11.5 | 6.6 | 36.7 | 4.9 | 7.8 | 6.0 | 14.5 |
| E1 | 10.3 | 6.5 | 4.1 | 29.0 | 3.0 | 4.6 | 3.8 | 10.4 |
| E2 | 17.8 | 4.4 | 2.2 | 29.0 | 7.4 | 3.1 | 2.1 | 17.9 |
| E3 | 13.1 | 5.6 | 3.4 | 29.0 | 5.9 | 4.2 | 3.2 | 13.2 |

Crystallization of Blends

A series of thermal experiments were performed using a TA Instruments Differential Scanning calorimeter (DSC). The $2^{nd}$ Heat Flow curve was used to indicate how much of the sample had crystallized over a select period of time at room temperature. The time at isotherm ranged from a short period of 5 min to a maximum period of 600 min Approximately 4 mg of each sample was weighed and recorded for each isotherm. For each sample, 11 DSC pans were made (for each isotherm) and each pan had a distinct crystallization time, tc, from a melt at 200° C. Per the heat-cool-heat cycle, each sample started at room temperature and was heated to 200° C. Once the high temperature was achieved, the sample was held at that temperature for a period of 10 min, before undergoing a rapid quench (50° C./min) to bring the sample back to room temperature. It is at this moment in the procedure that each pan (for each sample) was to be held for a specific tc value. After the time at the isotherm is achieved, the second melt (10° C./min to 200° C.) was performed. The second melt establishes the degree at which the samples melt, based upon the crystallinity from the isotherms held at room temperature.

The FIGURE shows the enhanced crystallization kinetics of blended materials, E1 and E3, over the comparative example CE1. The DSC data show the overall heat flow on the second melt, that is, after crystallizing at room temperature for a given time (tc). The greater the heat flow, the higher the crystallinity. E1 and E3 show an enhanced nucleation effect in crystallinity: after 20 minutes, greater crystallinity were achieved (as measured from 2$^{nd}$ melt after holding at room temperature at 20 mins). After about 90 minutes, E1 and E3 achieved substantially higher crystallinity than CE1. Faster crystallization in such materials is known to aid pellet stability.

Certain embodiments and features have been described using a set of numerical upper limits and a set of numerical lower limits. It should be appreciated that ranges from any lower limit to any upper limit are contemplated unless otherwise indicated. Certain lower limits, upper limits and ranges appear in one or more claims below. All numerical values are "about" or "approximately" the indicated value, and take into account experimental error and variations that would be expected by a person having ordinary skill in the art.

Various terms have been defined above. To the extent a term used in a claim is not defined above, it should be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application and for all jurisdictions in which such incorporation is permitted.

While the foregoing is directed to embodiments of the present invention, other and further embodiments of the invention may be devised without departing from the basic scope thereof, and the scope thereof is determined by the claims that follow.

What is claimed is:

1. A composition comprising
   (a) from about 70 wt % to about 90 wt % of a first propylene alpha-olefin copolymer component based on the weight of the composition, wherein the first component has an ethylene content of about 15 wt % to about 21 wt %; and
   (b) from about 10 wt % to about 30 wt % of a second propylene alpha-olefin copolymer component based on the weight of the composition, wherein the second component has an ethylene content of about 6 wt % to about 10 wt %;
   wherein the weight average molecular weight of the first component is about 250,000 to about 1,780,000 g/mol higher than the weight average molecular weight of the second component;
   wherein the reactivity ratio product of the first component is less than 0.75;
   wherein the reactivity ratio product of the second component is greater than or equal to 0.75; and
   wherein the composition has at least one of the following properties:
   (i) a tension set of less than about 15%;
   (ii) a top load of less than about 8 N;
   (iii) a retractive force of greater than about 3.5 N; or
   (iv) a hysteresis of less than about 35%.

2. The composition of claim 1, having:
   (i) a tension set of less than about 15%;
   (ii) a top load of less than about 8 N;
   (iii) a retractive force of greater than about 3.5 N; and
   (iv) a hysteresis of less than about 35%.

3. The composition of claim 1, wherein the first component has a weight average molecular weight of about 400,000 to about 1,800,000 g/mol and the second component has a weight average molecular weight of about 20,000 to about 150,000 g/mol.

4. A personal hygiene material, packaging material, or film, comprising the composition according to claim 1.

* * * * *